United States Patent
Armellin (10) Patent No.: US 7,238,248 B2
(45) Date of Patent: Jul. 3, 2007

(54) METHOD OF BUILDING A TYRE AND TYRE FOR A TWO-WHEELED VEHICLE

(75) Inventor: Giancarlo Armellin, Nova Milanese (IT)

(73) Assignee: Pirelli Pneumatici S.p.A., Milan (IT)

( * ) Notice: Subject to any disclaimer, the term of this patent is extended or adjusted under 35 U.S.C. 154(b) by 92 days.

(21) Appl. No.: 10/478,431

(22) PCT Filed: May 28, 2002

(86) PCT No.: PCT/EP02/05847

§ 371 (c)(1),
(2), (4) Date: Sep. 13, 2004

(87) PCT Pub. No.: WO02/096631

PCT Pub. Date: Dec. 5, 2002

(65) Prior Publication Data

US 2005/0061415 A1    Mar. 24, 2005

Related U.S. Application Data

(60) Provisional application No. 60/301,130, filed on Jun. 28, 2001.

(30) Foreign Application Priority Data

May 30, 2001    (EP) .................................. 01830350

(51) Int. Cl.
| | |
|---|---|
| *B29D 30/00* | (2006.01) |
| *B29D 30/06* | (2006.01) |
| *B60C 15/00* | (2006.01) |
| *B60C 9/00* | (2006.01) |

(52) U.S. Cl. .................... 156/110.1; 156/117; 156/123; 156/133; 152/539; 152/548; 152/550; 152/555

(58) Field of Classification Search ................ 152/550, 152/555
See application file for complete search history.

(56) References Cited

U.S. PATENT DOCUMENTS 3,044,523 A    7/1962    Drakeford et al.

(Continued)

FOREIGN PATENT DOCUMENTS

EP    0 507 184 A1    10/1992

(Continued)

*Primary Examiner*—Justin R. Fischer
(74) *Attorney, Agent, or Firm*—Finnegan, Henderson, Farabow, Garrett & Dunner, L.L.P.

(57) ABSTRACT

A method of building a tyre includes forming a carcass structure comprising at least one carcass ply, applying a belt structure at a radially external position with respect to the at feast one carcass ply, applying a pair of sidewalls at an axially external position with respect to side surfaces of the at least one carcass ply, applying a tread band to the belt structure at a radially external position of the belt structure, and applying annular stiffening inserts against the side surfaces of the at least one carcass ply before applying the sidewalls. Ends of the at least one carcass ply engage respective circumferentially inextensible annular anchoring structures. Each sidewall extends radially away from one of the annular anchoring structures. Each annular insert extends between one of the annular anchoring structures and a corresponding edge of the belt structure. A tyre for a two-wheeled vehicle is also disclosed.

29 Claims, 4 Drawing Sheets

U.S. PATENT DOCUMENTS

| | | | |
|---|---|---|---|
| 3,072,171 A | 1/1963 | Drakeford et al. | |
| 4,166,491 A | 9/1979 | Mezzanotte | |
| 4,287,929 A | 9/1981 | Huinink | |
| 5,529,104 A | 6/1996 | Delias et al. | |
| 5,660,656 A * | 8/1997 | Herbelleauu et al. | 152/547 |
| 6,318,432 B1 * | 11/2001 | Caretta et al. | 152/552 |
| 6,457,504 B1 * | 10/2002 | Caretta | 152/540 |
| 2004/0074580 A1 * | 4/2004 | Caretta | 152/517 |

FOREIGN PATENT DOCUMENTS

| | | |
|---|---|---|
| EP | 0 890 454 A2 | 1/1999 |
| EP | 0 928 680 A1 | 7/1999 |
| EP | 0 976 536 A2 | 2/2000 |
| EP | 0976535 * | 2/2000 |
| FR | 2055988 | 5/1971 |
| GB | 1222759 | 2/1971 |
| GB | 2121737 | 1/1984 |
| WO | 00/38906 | 7/2000 |
| WO | WO 01/36219 A1 | 5/2001 |

* cited by examiner

METHOD OF BUILDING A TYRE AND TYRE FOR A TWO-WHEELED VEHICLE

CROSS REFERENCE TO RELATED APPLICATIONS

This application is an national phase application based on PCT/EP02105847, filed May 28, 2002, the content of which is incorporated herein by reference, and claims the benefit of U.S. Provisional Application No. 60/301,130, filed Jun. 28, 2001, the content of which is incorporated herein by reference, and claims the right to priority based on European Application No. 01830350.3, filed May 30, 2001, the content of which is incorporated herein by reference.

BACKGROUND OF THE INVENTION

1. Field of the Invention

The present invention relates to a method of building a tyre, in particular for two-wheeled vehicles, comprising the steps of: forming a carcass structure on a toroidal support which carcass structure comprises at least one carcass ply having its ends in engagement with respective circumferentially-inextensible annular anchoring structures; applying a belt structure at a radially external position with respect to the carcass ply; applying a pair of sidewalls at an axially external position relative to side surfaces of the carcass ply each extending radially away from one of the annular anchoring structures towards said belt structure; applying a tread band to the belt structure at a radially external position.

The present invention also relates to a tyre, in particular for two-wheeled vehicles comprising: a carcass structure provided with at least one carcass ply having its ends in engagement with respective circumferentially-inextensible annular anchoring structures; a belt structure applied at a radially external position with respect to the carcass ply; a pair of sidewalls applied at an axially external position to side surfaces of the carcass ply each extending radially away from one of the annular anchoring structures towards said belt structure; a tread band applied to the belt structure at a radially external position.

2. Description of the Related Art

Building of tyres for two-wheeled vehicles in general involves formation of a carcass structure essentially made up of one or more carcass plies substantially shaped in a toroidal configuration and having their axially opposite side edges in engagement with respective annular reinforcing structures incorporating circumferentially inextensible annular elements, usually referred to as "rings".

Applied to the carcass structure, at a radially external position, is a belt structure comprising one or more belt strips in the form of a closed ring, essentially made up of textile or metallic cords which are suitably oriented with respect to each other and to the cords belonging to the adjacent carcass plies.

In addition, a tread band is applied to the belt structure at a radially external position, said tread band being usually made up of a strip of elastomer material of appropriate thickness.

To the aims of the present specification it should be pointed out that by the term "elastomer material" it is intended a rubber blend in its entirety, that is the combination of at least one base polymer suitably amalgamated with reinforcing fillers and process additives of various types.

Finally, a pair of sidewalls is applied to the opposite sides of the tyre being formed, each of said sidewalls covering a side portion of the carcass structure included between a so-called shoulder region, located close to the corresponding edge of the tread band, and a so-called bead located at the corresponding annular reinforcing structure.

While tyres for cars or trucks are characterised by a substantially flattened cross-section outline at the tread band, tyres for motorcycles are distinguishable due to their marked transverse curvature or bending, usually defined by the particular value of the ratio between the distance of the tread centre from the line passing through the opposite side extremities of the tread itself, measured at the equatorial plane of the tyre, and the distance measured along the tyre chord between said extremities. In tyres for two-wheeled vehicles the value of the bending ratio generally is at least as high as about 0.15 and it is usually in the order of 0.3 in the case of rear tyres, and even higher, until 0.45 in the case of front tyres, against a value usually smaller than 0.05 in tyres for motor-vehicles.

Leaving the destination of use out of consideration, i.e. irrespective of its being used for motor-vehicles or motor-cycles, tyres are generally classified in at least two categories which are different from each other due to the orientation of the cords being part of the carcass plies. In particular, there are the so-called "radial tyres" in which each of the cords arranged in the carcass ply or plies lies in a plane substantially radial to the rotation axis of the tyre, i.e. it has an orientation substantially orthogonal to the circumferential extension direction. In addition, there are tyres of the so-called "traditional type" or "crossed-ply tires" the carcass structure of which generally comprises at least a first carcass ply having cords oriented obliquely to the circumferential extension direction of the tyre, and a second carcass ply the cords of which have an oblique orientation which is symmetrically crossed with respect to the cords of the first ply.

As compared with tyres of the conventional type, radial tyres offer advantages in terms of lightness, ride comfort and structural strength at high speeds. Due to this circumstance, tyres of the conventional type practically fell in disuse in favour of tyres of the radial type, at least with reference to their use on cars and in the countries where a modern road network is present.

With reference to motorcycles as well, use of tyres of the radial type has recently imposed itself, in particular on motorcycles of recent conception involving use of low-section tyres, i.e. tyres in which the ratio of the section height, measured between the bead base and the tread band centre, to the maximum tyre width is, by way of example, less than 0.7.

There are however particular market sectors in which use of tyres of the radial type is presently precluded. This in particular occurs with reference to motorcycles mounting tyres with a rather high section ratio, by way of example greater than 0.7, as those of the so-called "custom" type in which the frame, suspensions and rims are inspired to technical and stylistic solutions going back to fifties and sixties. These motorcycles have recently awoken the interest of an important part of users, and today represent a non negligible portion of the circulating car pool. In terms of tyres, these vehicles both for aesthetic and functional reasons, require use of tyres having a high section ratio, which greatly conditions both the vehicle behaviour on the road and the tyre structure. In fact, these tyres, due to the important height of the sidewall, need carcass structures provided with rather stiff sidewalls to ensure the necessary vehicle steadiness in all use conditions, when running both on a straight stretch and on a bend. In all the above cases, resorting to tyres with a carcass structure of the conventional type, i.e. with several plies having mutually crossed cords that are inclined with respect to the circumferential direction, appears therefore necessary.

The Applicant has now perceived that the above tyres for motorcycles with a high section ratio, traditionally obtained by means of production processes involving assembling of previously made and stored semi-finished products, do not lend themselves to be constructed following production methodologies of recent conception, aiming at eliminating or at least limiting the necessity to produce and store semi-finished products.

An example of these production methodologies is described in document EP-A-0928680, in the name of the same Applicant, where each tyre component is directly made on a rigid toroidal support conforming in shape to the inner conformation of the tyre itself, using a semi-finished product continuously fed from an extruder or other appropriate devices. In more detail, one or more carcass plies are each obtained by laying down strip-like lengths in sequence and in mutual side by side relationship on the toroidal support, said strip-like lengths being obtained by cutting of a continuous semi-finished product directly coming from an extruder and comprising longitudinal cords incorporated in an elastomer layer. Other tyre components, such as the anchoring inserts incorporated in the annular reinforcing structures at the beads, are obtained by winding of a continuous thread-like element of metal material into radially superposed coils. Other components made of elastomer material such as the tread band, sidewalls and others, are obtained by winding up on the carcass structure, a continuous elongated element of elastomer material directly extruded from an extruder so as to form coils disposed in side by side and/or superposed relationship.

By adopting the above production methods important advantages could be achieved both in terms of productivity and in terms of production flexibility of the plants.

The Applicant has however perceived that, with use of such production methods, accomplishment of the traditional carcass structure with several plies having cords of crossed extension involves an important increase in the production times and costs, which neutralizes an important part of the advantages typically correlated with these production methodologies.

SUMMARY OF THE INVENTION

The Applicant has also become aware of the fact that, in accordance with the present invention, it is surprisingly possible to simplify the carcass structure of the tyres having a high section ratio, until enabling use of a single carcass ply of the radial type, while maintaining the tyre taken as a whole in an excellent ride behaviour. So this fact enables use of production methodologies of the type disclosed in document EP-A-0928680, with consequent economical advantages on the production process and qualitative advantages as regards the finished product. In particular, it was surprisingly found that important advantages in terms of structural simplification and lightening of the tyres for motorcycles with a high section ratio could be achieved by arranging appropriate auxiliary stiffening inserts at the tyre sidewalls.

The method in reference thus enables both low-section radial tyres intended for motorcycles of modern conception and radial tyres with a high section ratio intended for the so-called motorcycles of the custom type to be made on the same production line.

In more detail, the invention relates to a method of building a tyre, in particular for two-wheeled vehicles, characterized in that it comprises the step of applying annular stiffening inserts against the side surfaces of the carcass ply, before application of the sidewalls, which inserts each extend between one of the annular reinforcing structures and a corresponding edge of the belt structure.

The present invention also relates to a tyre, in particular for two-wheeled vehicles, characterized in that it further comprises annular stiffening inserts, each of which is axially interposed between the side surface of the carcass ply and one of said sidewalls, and extends between one of the annular reinforcing structures and a corresponding edge of the belt structure.

Patent FR 2,055,988 discloses a tyre for motor-vehicles, specifically for heavy-duty use in transportation and on the stocks, the beads of which are reinforced with an element resisting to tensile stresses which is spirally wound on the turned-up end of the carcass ply, substantially at the bead, and radially extending until the sidewall half-height at most, for the purpose of giving the beads the maximum strength without impairing the sidewall flexibility.

Likewise, U.S. Pat. No. 3,044,523 discloses the same type of reinforcement at the bead, indifferently located either at an axially external or an axially internal position with respect to the turned-up end of the carcass ply.

BRIEF DESCRIPTION OF THE DRAWINGS

Features and advantages of the method and the tyre in accordance with the invention will become more apparent from the detailed description of a preferred but not exclusive embodiment of a method of building a carcass structure for tyres, in particular for two-wheeled vehicles, and of a carcass structure obtainable by said method. This description will be set forth hereinafter with reference to the accompanying drawings, given by way of non-limiting example, in which.

DETAILED DESCRIPTION OF THE EXEMPLARY EMBODIMENTS

With reference to the drawings, a tyre, in particular for two-wheeled vehicles, built in accordance with the present invention has been generally identified by reference numeral 1.

Tyre 1 has a right section (FIG. 4) denoted by a high transverse curvature or bending: in more detail, said tyre shows a section height H measured along the equatorial plane between the centre of the tread band and the fitting diameter identified by the reference line r passing through the tyre beads.

Figure 4:
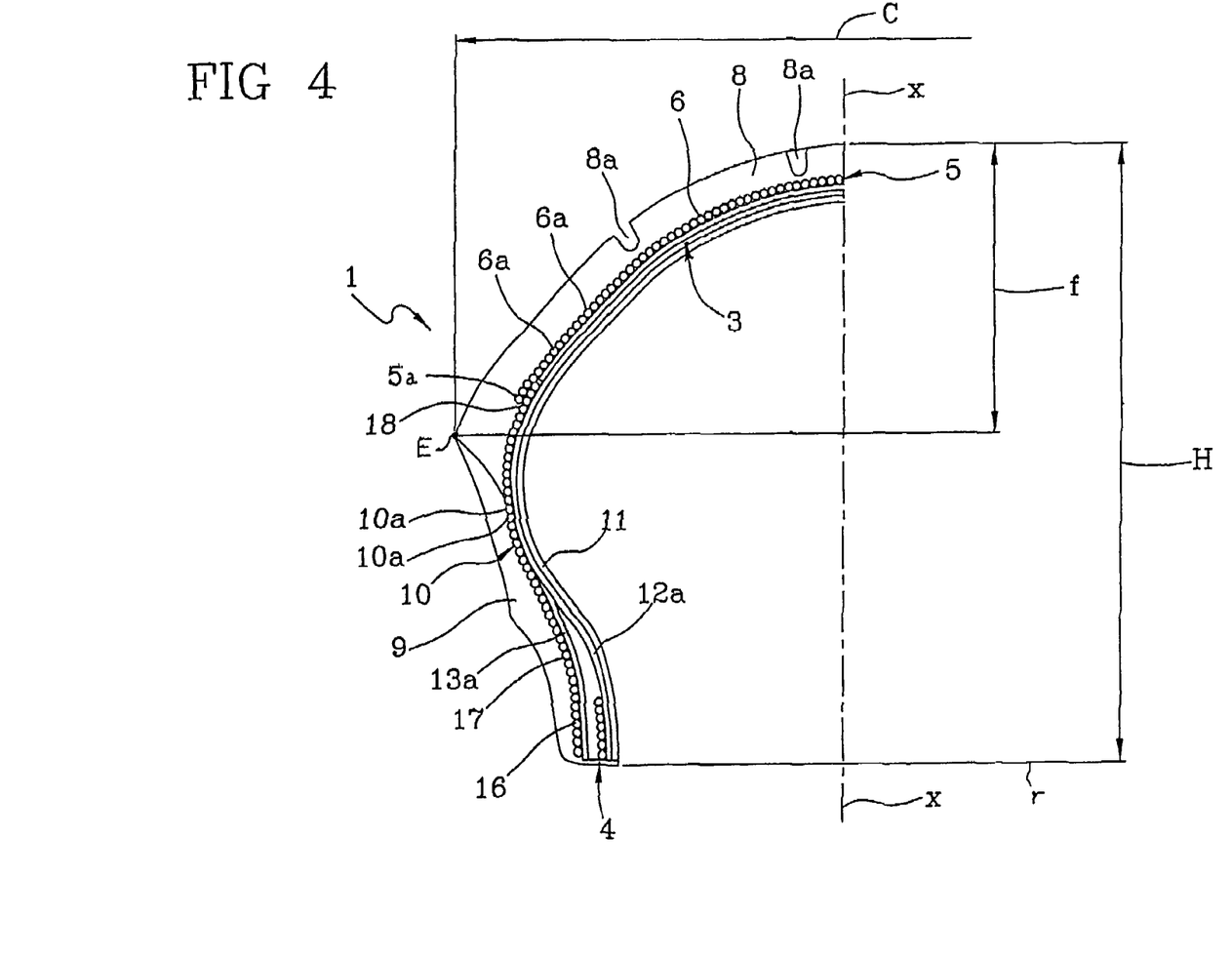
FIG. 4 is a fragmentary section taken along a plane radial to the rotation axis of the tyre, showing the cross-section outline of the tyre components.

In addition, tyre 1 has a width C defined by the distance between the laterally opposite ends E of the tread itself and a curvature defined by the particular value of the ratio between the distance f of the tread centre from the line passing through the tread ends, measured in the equatorial plane of the tyre, and width C. Preferably, the invention applies to tyres with a section ratio H/C equal to or higher than 0.70, designed for equipment of the above mentioned "custom" vehicles, and generally also identified by a bending ratio f/H higher than 0.30 in the rear tyres as well.

Tyre 1 comprises a carcass structure 2 having at least one carcass ply 3 with a substantially toroidal conformation and engaged through its axially spaced apart circumferential edges, with a pair of annular reinforcing structures 4 (only one of which is shown in the drawings) each of which, when the tyre has been completed, is placed in the tyre region usually identified as "bead".

Applied to the carcass structure 2, at a circumferentially external position, is a belt structure 5 comprising at least one primary belt strip 6, formed of one or more continuous parallel cords or other appropriate thread-like elements, wound up into coils 6a which are disposed in axial side by side relationship and oriented with a substantially null angle relative to the equatorial plane of the tyre, as well as of possible auxiliary belt strips 7a, 7b (diagrammatically shown in chain line in FIG. 1) located at a radially internal position relative to the primary belt strip 6. Circumferentially superposed on the belt structure 5 is a tread band 8 in which, following a moulding operation carried out concurrently with tyre vulcanization, longitudinal and/or transverse grooves 8a can be formed and disposed to define a desired "tread pattern".

Tyre 1 also comprises a pair of so-called "sidewalls" 9 laterally applied to the carcass structure 2 on opposite sides thereof, and at least one pair of auxiliary stiffening inserts 10. Each auxiliary stiffening insert 10 is axially interposed between a respective side surface of the carcass ply 3 and one of the sidewalls 9, and preferably extends between one of the annular reinforcing structures 4 and a corresponding side edge of the belt structure 5.

The carcass structure 2 can be optionally coated on its inner surface with a so-called "liner" 11 essentially consisting of a layer of air-tight elastomeric material adapted to ensure a hermetic seal to the tyre when inflated.

The present invention is advantageously put into practice within the context of a building method according to which, except for that which is described in more detail in the following of the present specification, assembling of the above listed components as well as production of one or more of them, is preferably obtained following the teachings proposed for example in document EP-A-0976536 in the name of the same Applicant.

As provided in the above mentioned document, the components of tyre 1 are each obtained by laying down on a toroidal support 1a (only diagrammatically shown) the shape of which matches that of the inner conformation of the tyre, one or more elements each obtained from an elongated semi-finished product continuously fed in the vicinity of the toroidal support itself.

The toroidal support 1a, of a cross-section outline having a bending ratio at least as high as 0.15, in conformity with the bending ratio of tyre 1 to be made, can have reduced sizes with respect to those of the finished tyre, of a linear-measure value preferably included between 0.5% and 2%, taken by way of example along the circumferential extension of the support itself at an equatorial plane X—X thereof which is coincident with the equatorial plane of tyre 1.

In more detail, liner 11 can be obtained by winding up a continuous strip-like element of appropriate elastomer material on the outer surface of the toroidal support 1a to form a plurality of coils 11a disposed in axial side by side relationship so as to follow the cross-section outline of the outer surface of the toroidal support 1a, and/or radially superposed so as to define a continuous layer adapted to integrally coat the inner surface of tyre 1.

To the aims of the present description, by cross-section outline it is intended the configuration shown by the half-section of the toroidal support 1a and/or any annular component of tyre 1, sectioned along a plane radial to a geometric rotation axis (not shown) of the tyre itself.

Each carcass ply 3 can be in turn made up of a plurality of strip-like lengths 12, 13 obtainable by cutting operations carried out on a narrow band or similar strip-like continuous element fed from a calender or an extruder and comprising longitudinal cords parallel to each other and incorporated in a layer of elastomer material. The strip-like lengths 12, 13 are circumferentially distributed around the geometric axis of tyre 1 and each extend in a U-shaped configuration to define two side portions 12a, 13a spaced apart from each other in an axial direction, and a crown portion 12b, 13b extending at a radially external position between the side portions 12a, 13a.

Figure 1:
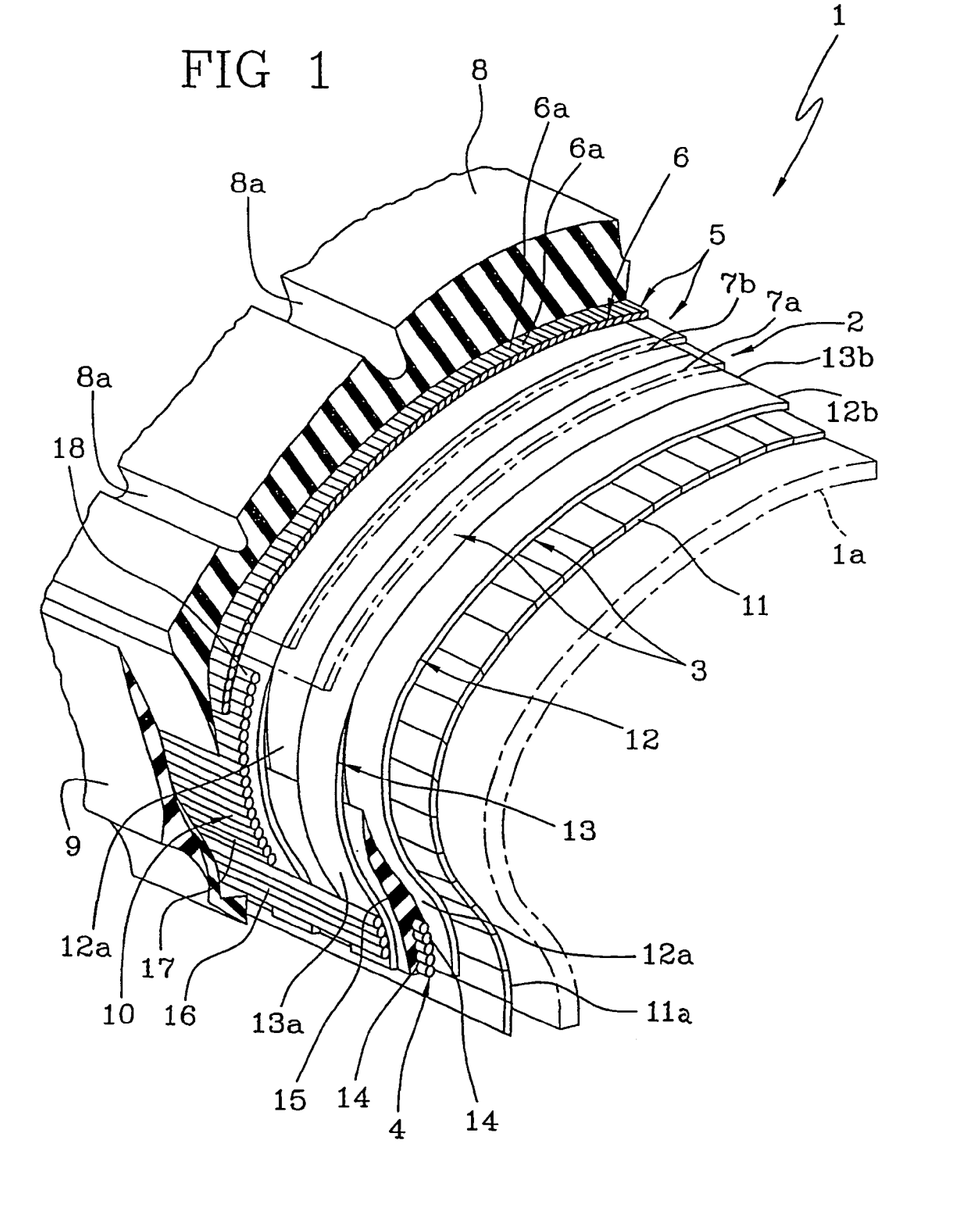
FIG. 1 is a fragmentary and cut-away perspective view of a tyre provided with a carcass structure obtained in accordance with the present invention.
Figure 2:
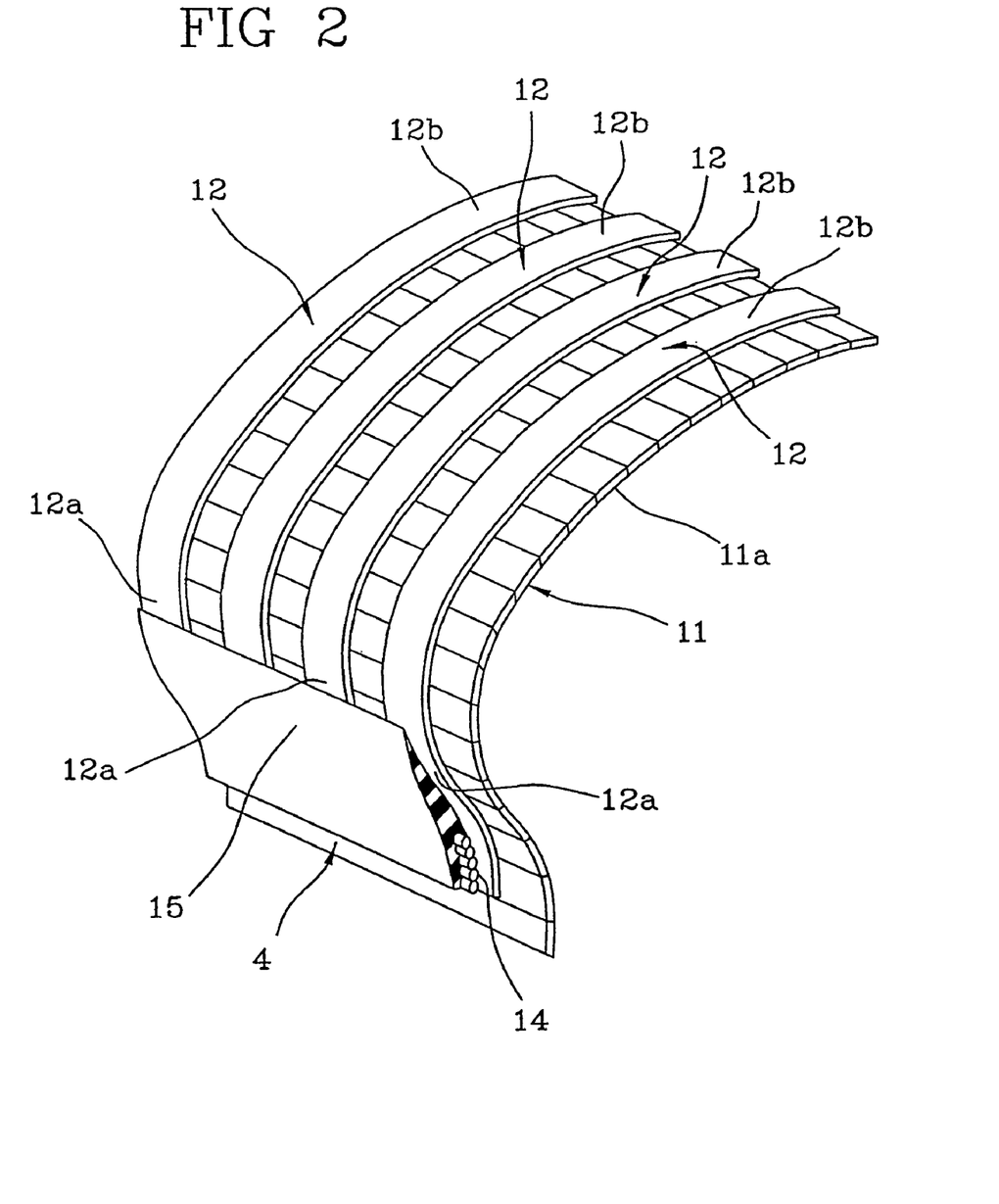
FIG. 2 is a diagrammatic fragmentary perspective view showing application of a first series of strip-like lengths for the purpose of forming a carcass ply of the tyre in accordance with the invention, with an annular reinforcing structure laterally applied to the end flaps of the strip-like lengths themselves.
Figure 3:
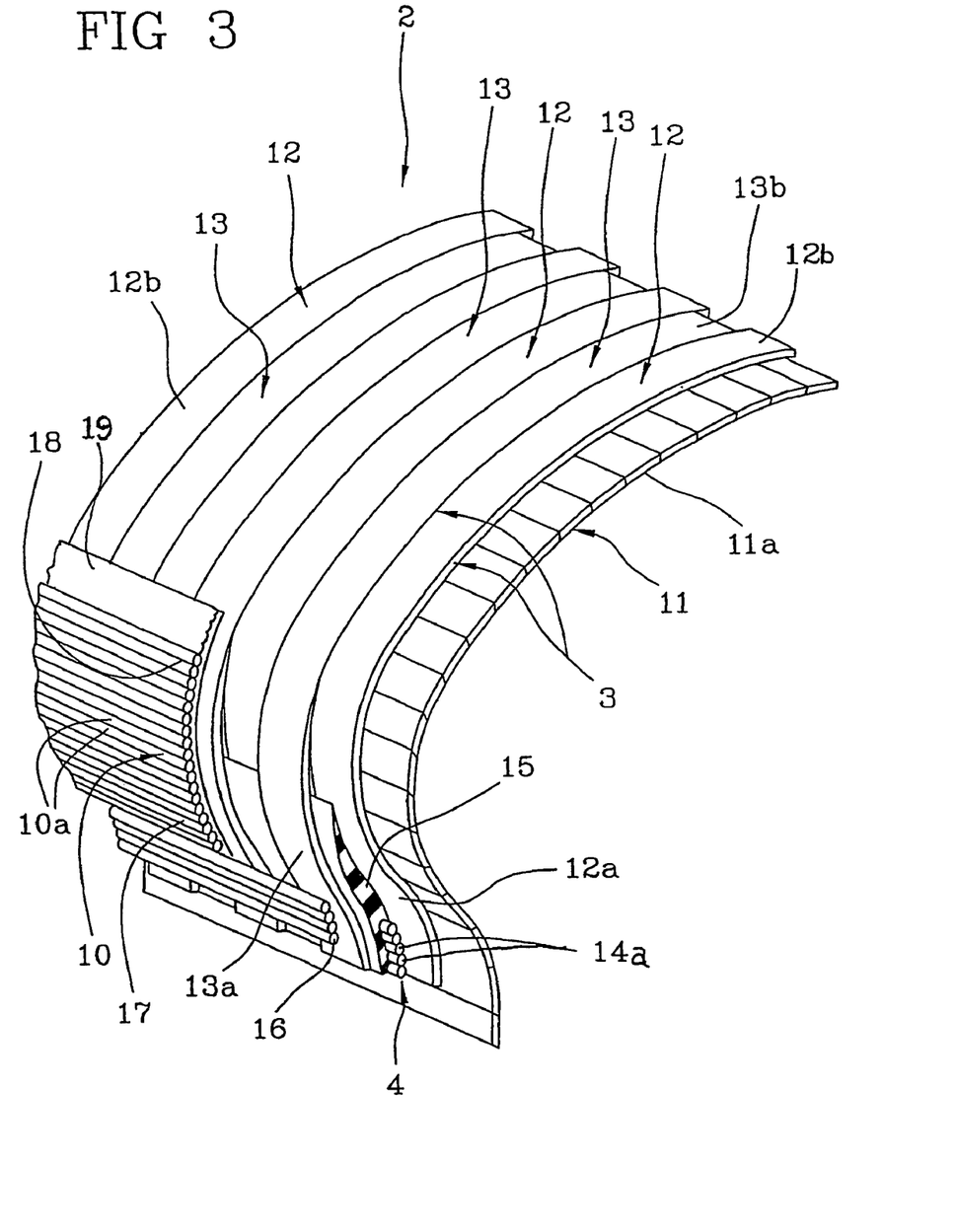
FIG. 3 is a fragmentary perspective view of a second series of strip-like lengths with the respective end flaps superposed on the annular reinforcing structure, and an annular stiffening insert laterally applied to the carcass ply, together with an auxiliary annular anchoring insert being part of the annular reinforcing structure.

In more detail, the presence of a first series of strip-like lengths 12 and a second series of strip-like lengths 13 is preferably provided and they are laid down on the toroidal support 11 in two successive steps and have the respective side portions 12a, 13a axially spaced apart from each other by interposition of one or more of the construction components belonging to the annular reinforcing structures 4. The strip-like lengths 12, 13 belonging to the first and second series respectively can be distributed with a circumferential pitch substantially corresponding to their width to form two separate carcass plies. For tyres intended for use in motorcycles although having a relatively high section ratio, higher than 0.70 by way of example, it is however preferably provided that, as shown in FIG. 1, the strip-like lengths 12, 13 of each series should be distributed according to a circumferential pitch corresponding to a multiple of their width, so that the crown portions 13b of lengths 13 belonging to the second series are each interposed between the crown portions 12b belonging to two consecutive lengths of the first series 12, to form a single carcass ply 3 altogether.

Depending on requirements, the strip-like lengths 12, 13 belonging to the first and second series can be laid down in planes that are radial to the rotation axis of the toroidal support 1a, or offset in parallel relative to a radial plane, on opposite sides with respect to said plane, as described in document WO 00/38906 in the name of the same Applicant, to obtain a respectively crossed orientation of their side portions 12a, 13a, keeping the crown portions 12b, 13b oriented perpendicular to a circumferential direction. Deposition of the strip-like lengths 12, 13 belonging to the first and second series can be also carried out in inclined and mutually crossed orientations relative to the circumferential extension direction of the toroidal support 1a, to give the crown portions 12b, 13b a desired inclination, which however preferably must not exceed 20 degrees, with respect to said circumferential direction.

Each of the annular reinforcing portions 5 preferably accomplished after deposition of at least the strip-like lengths 12 belonging to the first series, comprises at least one annular anchoring insert 14 which is substantially inextensible in a circumferential direction and is located close to the radially internal edge of the carcass structure 3, and a filling insert 15 of elastomer material tapering radially away from the anchoring insert 14.

The first annular anchoring insert 14 is preferably obtained by winding of a continuous metallic cord or other suitable thread-like element directly against the side portions 12a of lengths 12 belonging to the first series, so as to form a plurality of coils 14a that are radially superposed in succession. The filling insert 15 can be in turn directly formed in contact with the annular anchoring insert 14, for instance by application of a continuous strip of suitable elastomer material coming out of an extruder located close to the toroidal support 1a. The continuous strip may have the final conformation in section of the filling body 15 already on coming out of the respective extruder. Alternatively, the continuous strip will have a reduced section as compared with that of the filling body 15, and the latter will be obtained by application of the strip itself in several coils disposed in side by side and/or superposed relationship, to define the filling body 15 in its final configuration.

Each annular reinforcing structure 4 may further comprise an auxiliary annular anchoring insert 16, which is also obtainable by winding up a metallic cord or other appropriate continuous thread-like element, directly against the side portions 13a of the strip-like lengths 13 belonging to the second series, previously applied to the filling body 15 in superposed relationship therewith.

The materials for producing the continuous thread-like element and the related structural configurations for said annular inserts 14 and 16 have been known for long to those skilled in the art and consequently they are not further described herein.

Before or after deposition, as in the case herein illustrated, of the strip-like lengths 13 belonging to the second series, application of the stiffening inserts 10 against the side surfaces of the carcass ply 3 is carried out.

In more detail, each stiffening insert 10 is preferably made by winding up at least one continuous thread-like element so as to form concentric coils 10a directly against the side portions 12a, 13a of the strip-like lengths 12, 13. These coils can be disposed radially close to each other or mutually spaced apart, by a constant or varying pitch, along the radial extension of the sidewall, depending on requirements.

The thread-like element employed for making the annular stiffening inserts 10 may advantageously consist of a textile, metallic or other hybrid-type cord. The cord can be of the one-strand type, a 1×5 cord for example, or of the multi-strand type, a 3×3 cord for example. Preferred materials are steel for the metallic cords, polyamide fibres for the textile cords. In a preferred embodiment the cord is of the 3×3 type, i.e. it is made up of 3 strands each of 3 wires of high-carbon (>0.8%) steel, of the high-elongation (HE) Lang's lay type, i.e. it has the wires in the strands and the strands in the cord twisted in the same direction, with identical winding pitches or pitches that are different from each other.

Preferably, the diameter of said wires is included between 0.12 and 0.38 mm inclusive. At all events the type of cord adopted must enable some expansion of the tyre sidewalls, in particular in a radial direction, without increasing yielding of same.

Winding of the thread-like element for accomplishment of each stiffening insert can be conveniently carried out starting from a radially internal edge 17 of the stiffening insert itself, at the respective annular reinforcing structure 4, until a radially external edge 18 arranged at a corresponding side edge 5a of the belt structure 5, or in the opposite way.

Afterwards the belt structure 5 is made, which comprises at least one primary strip made up of cords oriented circumferentially with respect to the tyre. In more detail, it is provided for the purpose that the primary belt strip 6 should be obtained by winding up into coils disposed mutually close on the carcass ply 3, at least one continuous thread-like element consisting of a steel cord for example, of the high-starting-elongation type, the tensile behaviour of which, represented on a load/elongation graph, is characterized by the presence of a starting stretch of a low slope which is an index of high extensibility for low loads, followed by an end stretch of a marked slope which is an index of high toughness for loads higher than a predetermined value. In particular, preferably used are cords in which the transition region (knee) between the starting stretch and the end stretch of the load/elongation curve extends in a range included between 0.7% and 3%: for instance, in cords of 3×3×0.175 size adopted in a preferred embodiment of the invention, this transition region extends around an elongation in the order of 0.7%.

Advantageously, as viewed from the accompanying figures, during the step of accomplishing the primary belt strip 6, overlapping may be provided to be caused, of a measure included between 2 and 5 wires for example, between each of the edges 5a of the belt structure 5 and the radially external edge 18 of the respective auxiliary stiffening insert 10. Alternatively, the radially external edge 18 of the stiffening insert 10 may be spaced apart a measure included again by way of example between 2 and 5 wires, from the corresponding side edge 5a of the belt structure 5.

According to a preferred embodiment of the invention, the radially external edge 18 of the stiffening insert 10 is disposed in side by side relationship with the corresponding side edge 5a of the belt structure 5, so as to constitute a continuous structure extending from bead to bead without gap. Still more preferably, such a continuous structure is made up of spiralled coils of one and the same cord from one bead to the other, passing through the tyre crown portion.

The spiralling pitch of said cord can vary along the structure extension and in particular at the crown portion, so as to give origin to a belt strip with a differentiated density between the centre and shoulders of said crown portion.

Prior to accomplishment of the annular stiffening inserts 10, as well as of the belt structure 5 and/or the auxiliary anchoring insert 16 belonging to the annular reinforcing structures 4, at least one elastomer substrate 19 of a thickness included, by way of example, between 0.2 mm and 1 mm, preferably equal to 0.7 mm, can be advantageously formed against the carcass ply 3, said substrate being formed by winding of at least one continuous elongated element of elastomer material into coils disposed mutually in side by side and/or superposition relationship against the outer surface of the carcass ply 3.

With use of an elongated element of lenticular section and/or adoption of further suitable expedients, such as partial overlapping of the coils formed thereby, circumferential furrows can be generated in the elastomer substrate 19 that lend themselves to retain the coils formed by the annular stiffening inserts 10, the primary belt layer 6 and the possible auxiliary anchoring inserts 16, in order to stabilize positioning of same on the carcass ply 3.

As shown in the drawings, winding of the cord or other continuous thread-like element designed to make each annular stiffening insert 10 is conveniently provided to be carried out according to a substantially constant pitch, to give origin to coils 10a substantially spaced apart the same distance from each other and preferably distributed with a density included between 2 and 7 threads per centimetre.

Alternatively, winding can be carried out with a variable pitch in a continuous or discontinuous manner, for instance with a value close to the edges 5a of the belt structure 5 which is lower than the value measurable at the annular reinforcing structures 4, or vice versa.

It may be also conveniently provided that the annular stiffening inserts 10 should be accomplished together with at least one of the belt layers 6, 7a, 7b being part of the belt structure 5, and/or together with the auxiliary anchoring inserts 16 being part of the annular reinforcing structures 4. In particular, for the purpose, the possible auxiliary anchoring inserts 16, primary belt layer 6 and annular stiffening inserts 10 may be provided to be formed of a single cord or several parallel cords wound up into coils distributed with a constant or a varying pitch depending on requirements, between one and the other annular reinforcing structure 4, along the whole cross-section outline of the carcass structure 2.

Then sidewalls 9, obtainable in any manner convenient for a person skilled in the art are applied to the thread band 8.

It will be now appreciated that the tyre structure simplified as above stated can also be obtained using the traditional building plants and following the traditional methodologies providing for use of a second-step shaping drum, of the expandable type, well known to those skilled in the art.

Tyre 1 thus built now lends itself to be submitted, after possible removal from support 1a, to a vulcanization step that can be conducted in any known and conventional manner.

The present invention achieves important advantages.

In fact, it is to be noted that strengthening of the tyre sidewalls by the annular stiffening inserts 10 enables the expected qualities of dynamic rigidity of the sidewall to be achieved even on tyres with a high section ratio, without for the purpose requiring adoption of complicated construction solutions in the carcass plies. In particular, it is possible to drastically simplify the design schemes in the carcass structure, particularly in connection with the number and arrangement of the plies, until adopting, as provided in the above described embodiment, design schemes typical of the tyres of the radial type.

This, on the one hand, enables the tyres for motorcycles with a high section ratio to be given all advantages typical of radial tyres, such as a greater lightness and better ride comfort, for instance.

In addition, the possibility of using a radial carcass structure for building tyres with a high section ratio greatly facilitates adoption of production methodologies of the type described in said documents EP-A-0928680 and EP-A-0976536, in which working operations relating to construction of the carcass plies affect productivity and production costs to a relatively high degree.

It should be also noted that the above described advantages are surprisingly achieved through the introduction of additional components in the carcass structure, in opposition to those that should be the normal expectations of a person skilled in the art resulting from the knowledge that generally the greater the number of components of a tyre structure is, the more said structure is complicated, delicate in its accomplishment and critical as regards control.

It should be also noted that the invention, while particularly performing its beneficial effects in tyres with a high section ratio for motorcycles, is not limited to the latter but can be usefully adopted with all types of tyres.

The invention claimed is:

1. A method of building a tyre, comprising:
    forming a carcass structure comprising at least one carcass ply;
    applying a belt structure at a radially external position with respect to the at least one carcass ply;
    applying a pair of sidewalls at an axially external position with respect to side surfaces of the at least one carcass ply;
    applying a tread band to the belt structure at a radially external position of the belt structure; and
    applying annular stiffening inserts against the side surfaces of the at least one carcass ply before applying the sidewalls;
    wherein ends of the at least one carcass ply engage respective circumferentially inextensible annular anchoring structures,
    wherein each sidewall extends radially away from one of the annular anchoring structures,
    wherein each annular insert extends from one of the annular anchoring structures to a corresponding edge of the belt structure, and
    wherein each annular insert is formed by winding at least one continuous thread element into concentric coils.

2. The method of claim 1, wherein the annular inserts are applied before the belt structure is applied.

3. The method of claim 2, wherein during applying the belt structure, the edges of the belt structure are each superposed on a radially external edge of one of the annular inserts.

4. The method of claim 1, wherein the at least one thread element is wound with a substantially constant pitch, so that the coils are substantially spaced apart a same distance from each other.

5. The method of claim 1, wherein the at least one thread element is wound with a pitch that has a lower value close to the annular anchoring structures than close to the edges of the belt structure.

6. The method of claim 1, wherein the at least one thread element is wound with a pitch that has a higher value close to the annular anchoring structures than close to the edges of the belt structure.

7. The method of claim 1, wherein the at least one thread element is wound with a varying pitch between the annular anchoring structures and the edges of the belt structure.

8. The method of claim 1, wherein applying the annular inserts is preceded by forming an intermediate elastomer substrate against an outer surface of the at least one carcass ply.

9. The method of claim 1, wherein the elastomer substrate is formed by winding at least one continuous elongated element of elastomer material into coils disposed in mutual side-by-side, superposed, or side-by-side and superposed relationship against the outer surface of the at least one carcass ply.

10. The method of claim 1, wherein forming the carcass structure comprises:
    preparing strip lengths;
    disposing the strip lengths, circumferentially distributed, on a toroidal support to form the at least one carcass ply; and
    applying the annular anchoring structures close to inner circumferential edges of the at least one carcass ply;
    wherein each strip length comprises longitudinal and parallel thread elements at least partly coated with at least one layer of elastomer material, and wherein each of the strip lengths extends in a substantially U-shaped configuration around a cross-section outline of the toroidal support to define two side portions, mutually spaced apart in an axial direction, and a crown portion, extending at a radially external position between the side portions.

11. The method of claim 10, wherein forming the at least one carcass ply comprises:
disposing a first series of the strip lengths on the toroidal support;
applying at least first annular anchoring inserts of the annular anchoring structures against end flaps of the strip lengths of the first series; and
disposing a second series of the strip lengths on the toroidal support;
wherein the first series of strip lengths are circumferentially distributed with a circumferential pitch corresponding to a multiple of a width of the strip lengths of the first series,
wherein each strip length of the second series comprises end flaps that are superposed on respective first annular inserts at an axially opposite position relative to the end flaps of the strip lengths of the first series.

12. The method of claim 11, wherein the strip lengths of the first series are disposed in first deposition planes,
wherein the strip lengths of the second series are disposed in second deposition planes,
wherein the first deposition planes are offset in parallel from a plane radial to a rotation axis of the toroidal support,
wherein the second deposition planes are offset in parallel from the plane radial to the rotation axis of the toroidal support, and
wherein the first and second deposition planes are offset on opposite sides of the plane radial to the rotation axis of the toroidal support.

13. The method of claim 11, wherein the annular inserts are applied against the side portions of the strip lengths of the first series before disposing the second series of the strip lengths.

14. A tyre for a two-wheeled vehicle, comprising:
a carcass structure comprising at least one carcass ply;
a belt structure applied at a radially external position with respect to the at least one carcass ply;
a pair of sidewalls applied at an axially external position with respect to side surfaces of the at least one carcass ply;
a tread band applied to the belt structure at a radially external position of the belt structure; and
annular stiffening inserts axially interposed between the side surfaces of the at least one carcass ply and the sidewalls;
wherein ends of the at least one carcass ply engage respective circumferentially inextensible annular anchoring structures,
wherein each sidewall extends radially away from one of the annular anchoring structures,
wherein each annular insert extends from one of the annular anchoring structures to a corresponding edge of the belt structure, and
wherein each annular insert comprises at least one continuous thread element wound into concentric coils.

15. The tyre of claim 14, wherein the belt structure comprises edges that are superposed on radially external edges of the annular inserts.

16. The tyre of claim 14, wherein the coils of the at least one thread element are substantially spaced apart a same distance from each other.

17. The tyre of claim 14, wherein the coils of the at least one thread element comprise a distribution pitch that has a lower value close to the annular anchoring structures than close to the edges of the belt structure.

18. The tyre of claim 14, wherein the coils of the at least one thread element comprise a distribution pitch that has a higher value close to the annular anchoring structures than close to the edges of the belt structure.

19. The tyre of claim 14, further comprising at least one intermediate elastomer substrate interposed between the at least one carcass ply and the annular inserts.

20. The tyre of claim 14, wherein the at least one thread element comprises at least one metal cord of a 3×3×0.175 HE HT type.

21. The tyre of claim 14, wherein the at least one carcass ply comprises:
a plurality of strip lengths circumferentially distributed around a geometric axis of the tyre;
wherein each strip length comprises longitudinal and parallel thread elements at least partly coated with at least one layer of elastomer material, and
wherein each of the strip lengths extends in a substantially U-shaped configuration of a cross-section outline of the carcass structure to define two side portions, mutually spaced apart in an axial direction, and a crown portion, extending at a radially external position between the side portions.

22. The tyre of claim 21, comprising:
a first series of the strip lengths; and
a second series of the strip lengths;
wherein each of the annular anchoring structures comprises at least one annular insert axially interposed between the strip lengths of the first series and the strip lengths of the second series.

23. The tyre of claim 22, wherein the strip lengths of the first series are disposed in first deposition planes,
wherein the strip lengths of the second series are disposed in second deposition planes,
wherein the first deposition planes are offset in parallel from a plane radial to the geometric rotation axis of the tyre,
wherein the second deposition planes are offset in parallel from the plane radial to the geometric rotation axis of the tyre, and
wherein the first and second deposition planes are offset on opposite sides of the plane radial to the geometric rotation axis of the tyre.

24. The tyre of claim 22, wherein the annular inserts are axially interposed between the side portions of the strip lengths of the first series and the side portions of the strip lengths of the second series.

25. A method of building a tyre, comprising:
forming a carcass structure comprising at least one carcass ply;
applying a belt structure at a radially external position with respect to the at least one carcass ply;
applying a pair of sidewalls at an axially external position with respect to side surfaces of the at least one carcass ply;
applying a tread band to the belt structure at a radially external position of the belt structure; and
applying an annular stiffening insert against the side surfaces of the at least one carcass ply before applying the sidewalls, wherein ends of the at least one carcass ply engage respective circumferentially inextensible annular anchoring structures, each sidewall extends radially away from one of the annular anchoring structures, and the annular insert extends at least from one of the annular anchoring structures to a corresponding edge of the belt structure, wherein the belt structure includes at least one belt layer, and wherein the annular insert and the at least one belt layer of the belt structure are formed by winding at least one common continuous thread element into coils distributed between the annular anchoring structures.

26. The method of claim 25, wherein the annular insert constitutes part of the belt structure, the annular insert extends continuously between the annular anchoring structures.

27. The method of claim 26, wherein the belt structure comprises spiraled coils of cord extending from a first annular anchoring structure to an axially opposite second annular anchoring structure.

28. The method of claim 26, wherein the belt structure includes of spiraled coils of cord extending from a first annular anchoring structure to an axially opposite second annular anchoring structure.

29. A tyre for a two-wheeled vehicle, comprising:
a carcass structure comprising at least one carcass ply;
a belt structure applied at a radially external position with respect to the at least one carcass ply;
first and second sidewalls applied at an axially external position with respect to side surfaces of the at least one carcass ply;
a tread band applied to the belt structure at a radially external position of the belt structure; and
an annular stiffening insert axially interposed between the side surfaces of the at least one carcass ply and the first and second sidewalls;
circumferentially inextensible annular anchoring structures, ends of the at least one carcass ply engaging respective ones of the circumferentially inextensible annular anchoring structures, wherein each sidewall extends radially away from one of the annular anchoring structures, and the annular insert extends at least from one of the annular anchoring structures and to a corresponding edge of the belt structure, wherein the belt structure includes at least one belt layer, and wherein the annular insert and the at least one belt layer of the belt structure are formed by winding at least one common continuous thread element into coils distributed between the annular anchoring structures.

* * * * *